United States Patent
Wolfendale

[15] 3,702,957
[45] Nov. 14, 1972

[54] VARIABLE CAPACITANCE DISPLACEMENT TRANSDUCERS

[72] Inventor: Peter Caleb Frederick Wolfendale, Chiltern Close, Great Brickhill, Bletchley, Buckinghamshire, England

[22] Filed: Jan. 19, 1971

[21] Appl. No.: 107,636

[30] Foreign Application Priority Data

Jan. 23, 1970 Great Britain............3,407/70

[52] U.S. Cl...................317/246, 317/249 R, 323/93
[51] Int. Cl. .............................................H01g 5/00
[58] Field of Search.......317/246, 249 R, 249 T, 247; 323/93

[56] References Cited

UNITED STATES PATENTS 1,632,130  6/1927  Haddock................317/249 T
3,312,892  4/1967  Darnes........................323/93
3,570,003  3/1971  West......................317/249 R

OTHER PUBLICATIONS

McDowell et al., IBM Tech. Disclosure, Vol. 12, No. 8, 1–70, p. 1166.

Primary Examiner—E. A. Goldberg
Attorney—Laurence E. Laubscher

[57] ABSTRACT

A capacitive position transducer in which a movable element controls the ratio of the capacitances of two capacitors. The movable element is a screen which, in the preferred embodiments, moves between the plates of one of the capacitors thereby changing its capacitance. The ratio of said capacitances is used to provide an indication of the position of the screen and hence of the movable element.

5 Claims, 12 Drawing Figures

PATENTED NOV 14 1972

Peter C. F. Wolfendale
INVENTOR

BY
Lawrence E. Laubscher
ATTORNEY

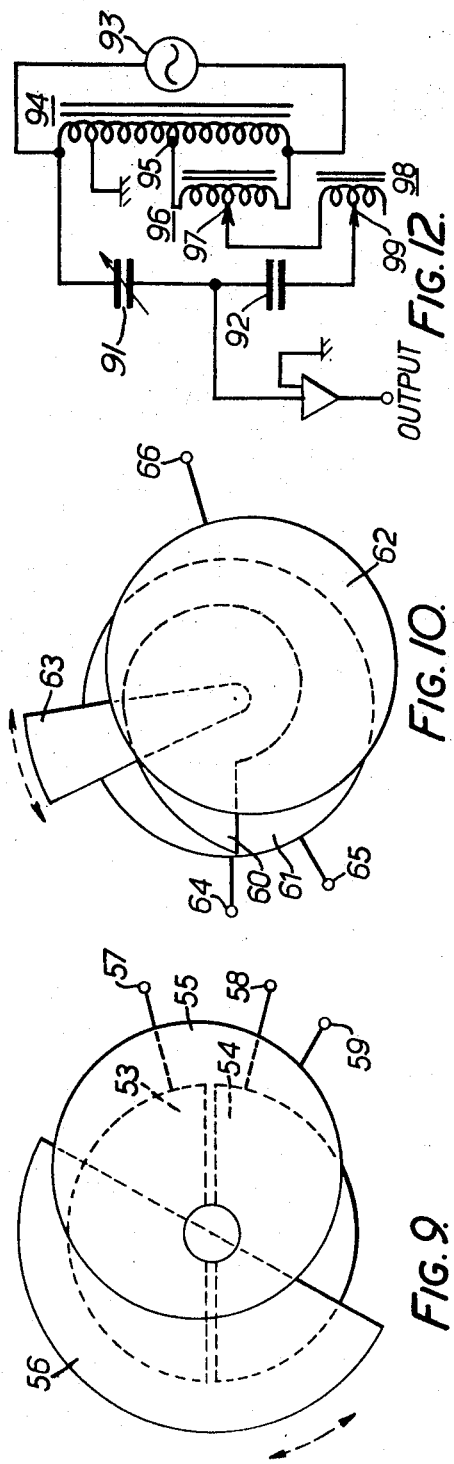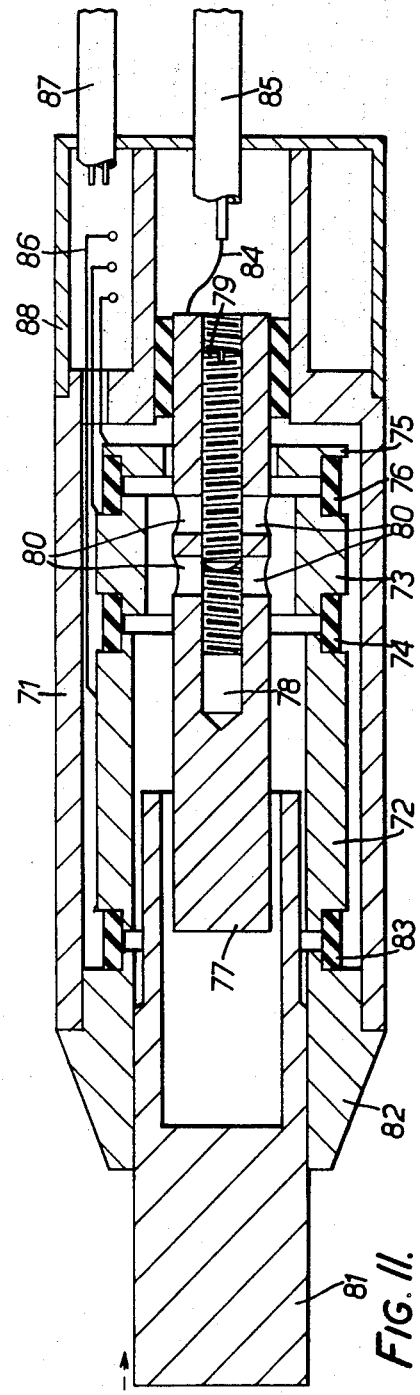

VARIABLE CAPACITANCE DISPLACEMENT TRANSDUCERS

BACKGROUND OF THE INVENTION

This invention relates to capacitive position transducers.

It has been proposed to provide a capacitive position transducer comprising a plurality of capacitor electrodes disposed side by side in line and a further capacitor electrode disposed facing the first electrodes, and guided for movement relative to and along the line of said first electrodes whereby the capacitive couplings between the further electrodes and the first electrodes are functions of the position of the further electrode relative to the first electrodes. Such a transducer can be used to measure position with a high degree of accuracy. Such an arrangement is described for example in U.S. Pat. application Ser. No. 866,648 filed Oct. 15, 1969, which issued as U.S. Pat. No. 3,566,222 on Feb. 23, 1971.

Such an arrangement requires that the movable electrode has applied to it an electrical potential in order that the change in relative values of the capacitances between said movable electrode and the first electrodes may be measured. This may be a disadvantage in some applications and it is an object of the invention to provide a capacitive transducer similar in many respects to the above described transducer in which the movable element can be maintained at earth potential.

SUMMARY OF THE INVENTION

Briefly the invention resides in providing a transducer similar to that described above but wherein all the electrodes are maintained fixed. The change in capacitance is produced by inserting and withdrawing a screen which is arranged to be capable of movement in the space between one of said first electrodes and the further electrode.

Accordingly the invention comprises a capacitive position transducer comprising first and second capacitor electrodes disposed adjacent to each other, a common capacitor electrode disposed uniformly spaced from said first and second electrodes, and a screen guided for movement in the space between said first electrode and said common electrode whereby the ratio between the capacitances between said first electrode and the common electrode and said second electrode and the common electrode varies in accordance with the position of said screen. The expression uniformly spaced implies that when the electrodes are planar, then the common capacitor electrode is parallel to said first and second capacitor electrodes, and when said first and second capacitor electrodes are cylindrical or form portions of cylinders, then said common capacitor electrodes is concentric therewith.

In order that the invention may be clearly understood and readily carried into effect it will now be described by way of example with reference to the accompanying drawings.

BRIEF DESCRIPTION OF THE DRAWINGS

FIGS. 9 and 10 are perspective views of capacitive angular position transducers.

FIG. 11 is a preferred practical form of an embodiment similar to that shown in FIG. 3, and FIG. 12 is a circuit arrangement for use with the transducer shown in FIG. 11.

DESCRIPTION OF THE PREFERRED EMBODIMENTS

Figure 1:
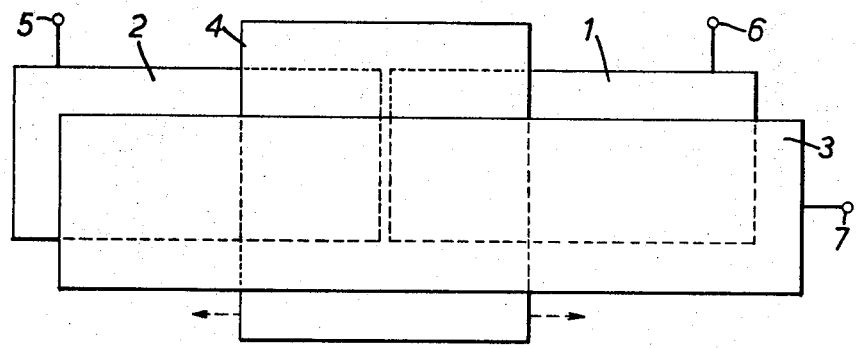
FIG. 1 is a perspective view of a capacitive linear position transducer.

Referring to FIG. 1 there is shown in perspective a differential capacitor. It comprises two planar electrodes 1 and 2 arranged in the same plane, and a third electrode 3 arranged in such a way as to face both the electrodes 1 and 2. The element 4 is a movable screen, electrically isolated from the other electrodes and arranged for movement in the space between electrode 3 and electrodes 1 and 2. In the arrangement shown all the elements 1, 2, 3 and 4 are parallel to each other. It will be appreciated that a capacitor is formed between electrodes 1 and 3 and between electrodes 2 and 3. As the screen 4 moves it modifies the coupling between electrode 3 and the other two electrodes 1 and 2 in a differential manner, thus what is deducted from one coupling is added to the other. Hence the device serves as a differential capacitor in which all the electrodes are fixed, the only moving element being the screen 4 which need not necessarily have any electrical connections to it. In practice if it is a conducting screen it will be connected to earth. However it may equally well be a dielectric screen having no connections to it which enhances the capacitance between the electrodes between which it is situated in a variable manner. Terminals 5 and 6 are connected to the electrodes 2 and 1 respectively and terminal 7 is connected to the common electrode 3.

Figure 2:
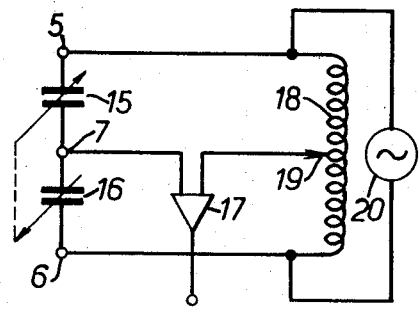
FIG. 2 is a circuit arrangement for use with the transducer shown in FIG. 1.

FIG. 2 illustrates a suitable electrical circuit for use with the arrangement shown in FIG. 1. It comprises a simple transformer ratio-arm bridge such as has been proposed by Blumlein for measuring capacitance ratios. The capacitors 15 and 16 represent the capacitance between elements 2 and 3 and between elements 1 and 3 respectively. The terminals 5 and 6 are connected to the carrier supply 20 and the reference potentiometer 18 which is a tapped inductance. Terminal 7 is connected to difference amplifier 17, the other input of which is connected to the tap 19 on reference potentiometer 18. The tap 19 may conveniently be at earth potential. In use, if the tap 19 is kept fixed the output from the difference amplifier 17 will provide an indication of the difference in capacitance of 15 and 16. However in an alternative arrangement the output from amplifier 17 is applied to a servo-mechanism (not shown) which is utilized to adjust the position of tap 19 for a null output of amplifier 17. The position of tap 19 then provides an indication of the difference in capacitance between 15 and 16.

Figure 3:
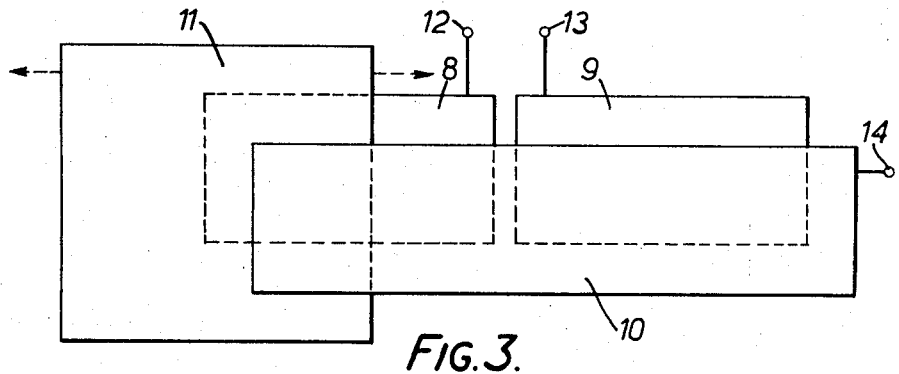
FIG. 3 is a perspective view of a capacitive transducer according to a preferred embodiment of the invention.

An alternative arrangement is shown in FIG. 3 and in this arrangement only one of the capacitances is varied. As in the arrangement shown in FIG. 1 the device comprises two electrodes 8 and 9 corresponding to the electrodes 1 and 2 of FIG. 1 and an electrode 10 facing these two electrodes corresponding to electrode 3 in FIG. 1. The screen 11, corresponding to screen 4 in FIG. 1, however is arranged so that it moves only between electrode 8 and electrode 10. This movement modifies the capacitance between electrode 8 and electrode 10, but since the screen 11 never enters the gap between electrode 9 and electrode 10, the capacitance therebetween remains constant. The use of the capacitance between electrodes 9 and 10 is as a reference capacitor which is closely coupled for purposes of environment such as temperature and humidity to the variable capacitor formed by electrodes 8 and 10 as modified by screen 11. Changes in one due to such causes as temperature and humidity can then be cancelled by changes in the other which will occur in the same ratio.

Figure 4:
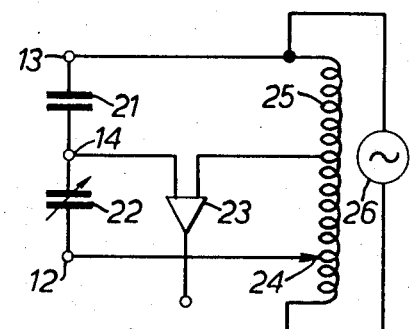
FIG. 4 is a circuit arrangement for use with the transducer shown in FIG. 3.

FIG. 4 shows a circuit arrangement which can be used with the arrangement shown in FIG. 3. Capacitor 21 represents the fixed capacitance between electrodes 9 and 10, and element 22 represents the variable capacitance between electrodes 8 and 10 as modified by screen 11. The circuit is similar to that shown in FIG. 2 but the second input to the differential amplifier 23 goes to a fixed tap on potentiometer 25 whilst the high potential terminal 12 of the variable capacitor 22 is connected to a variable tap on potentiometer 25. The operation of this circuit is exactly the same as that of the circuit shown in FIG. 2. The setting of the tap 24 at balance is a measure of the relative capacitances of elements 21 and 22. In both the arrangements shown in FIG. 1 and FIG. 3 the relative capacitance is a measure of the position or relative displacement of the screen 4 or 11 respectively.

Figure 5:
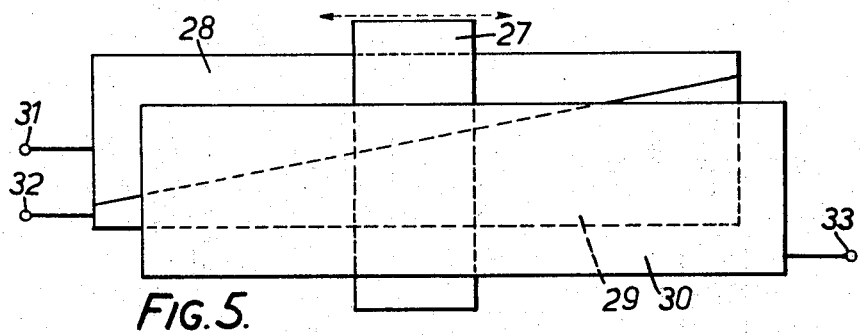
FIG. 5 is a perspective view of a capacitive transducer according to yet another embodiment of the invention.
Figure 6:
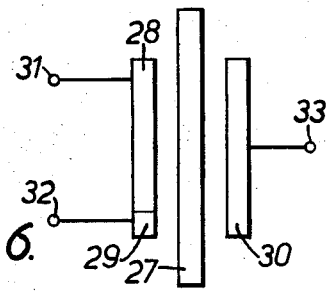
FIG. 6 is an end view of the arrangement shown in FIG. 5.

Referring now to FIG. 5 a variation of the arrangement shown in FIG. 1 is shown. One disadvantage of the arrangement shown in FIG. 1 in which the screen 4 moves in a direction at right angles to the line of the gap between electrodes 1 and 2 is that the length of screen 4 in the direction being measured as displacement must be greater than the length being measured. The arrangement shown in FIG. 5 is one which can be used in cases where this disadvantage must be overcome. In this arrangement the gap between the electrodes 28 and 29 (corresponding to electrodes 1 and 2 in FIG. 1) is diagonal to the line of movement of screen element 27 (corresponding to screen 4 in FIG. 1). The common electrode 30 corresponds to electrode 3 in FIG. 1. As the screen element 27 moves it will alter the relative capacitance between electrodes 28 and 30 and between electrodes 29 and 30. The electrical circuit for use with the arrangement shown in FIG. 5 would correspond to that shown in FIG. 2. In FIG. 6 there is shown an end view of the arrangement shown in FIG. 5 so that a better understanding of the physical arrangement may be obtained.

Figure 7:
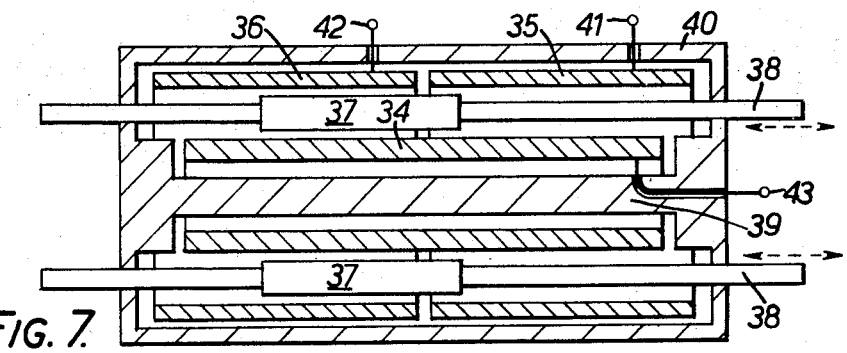
FIG. 7 is a cross-section of a practical form of a device similar to that shown in FIG. 1.

It will be appreciated that the arrangements shown in FIGS. 1, 3, 5 and 6 are illustrated in a symbolic form. FIG. 7 illustrates a preferred practical embodiment of the arrangement shown in FIG. 1. In this arrangement the electrodes are all of cylindrical form. The element 34 is a cylindrical electrode corresponding to the common electrode 3. OUtside this are arranged the two cylindrical electrodes 36 and 35 which correspond to the electrodes 1 and 2. The elements 35 and 36 therefore are cylinders which have capacitance to the common element 34. The capacitance between these elements is modified by the screen 37, also cylindrical, which can be moved along the axis of the cylinders by means of two rods 38. Displacement of these rods 38 with respect to the housing 40 of the device will cause a differential change in capacitance as described in connection with FIG. 1. The element 37 is a cylinder which moves in the space formed between cylinders 35 and 36 and the inner cylinder 34. The rods 38 are of uniform diameter and therefore have no effect on the capacitance of the three elements as they move the screen back and forth. The element 34 is mounted on rod 39 by means of suitable insulators. Rod 39 is firmly connected to the housing 40 which also carries the elements 35 and 36 suitably insulated from it. The housing 40 serves as a screen and as a means for mounting the transducer and also as bearings for the rods 38 thereby to keep them from allowing the screen 37 to touch the live electrodes. The electrodes 34, 35 and 36 are connected to the terminals 43, 41 and 42 respectively. It will be appreciated that it is not essential that the arrangement shown in FIG. 7 should be cylindrical. In alternative embodiments of the invention a shape other than cylindrical, for example square or plane electrodes as shown in FIG. 1, may be utilized.

Figure 8:
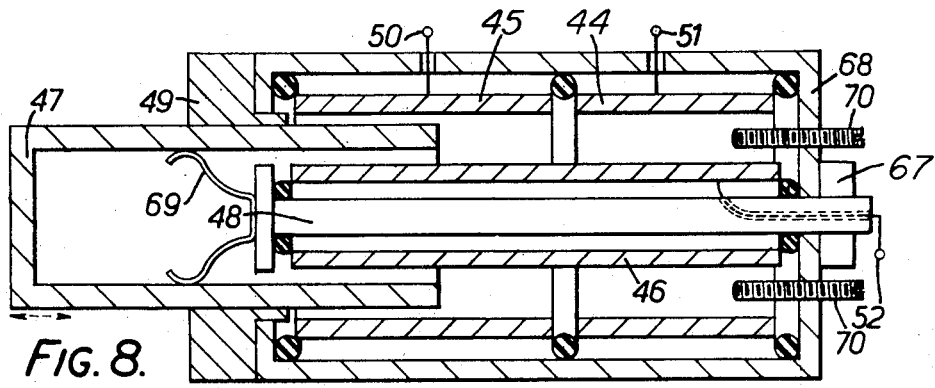
FIG. 8 is a cross section of a practical form of an embodiment similar to that shown in FIG. 3.

In FIG. 8 there is shown a preferred practical form of the arrangement shown symbolically in FIG. 3. It will be appreciated that this arrangement is very similar in many respects to that shown in FIG. 7. Thus the common electrode 46 is a cylinder corresponding to cylinder 34 in FIG. 7. The outer cylindrical electrodes 45 and 44 correspond to electrodes 36 and 35 in FIG. 7. The capacitance between electrodes 44 and 46 is fixed and is not affected by the movement of the screen 47 which moves in the space between electrodes 45 and 46 in a direction parallel to the axis of the transducer. The rod 48 fixes element 46 with respect to the housing 68 which in turn fixes the position of elements 44 and 45 relative to 46 and carries a bearing 49. The screen 47 slides coaxially in bearing 49 and is earthed to the case by a spring contact 69. The electrodes 43, 44 and 46 are connected to the terminals 50, 51 and 52 respectively. A nut 67 clamps the rod 48 in place.

The two screws 70 are utilized to modify the capacitance between electrodes 44 and 46 so as to adjust the relative slope of indication with respect to the displacement of screen 47.

Although the arrangements so far described are for use in measuring linear displacement the invention may also be utilized in devices for measuring angular displacement. FIG. 9 illustrates an arrangement corresponding to the one shown in FIG. 1 for such use. In place of the electrodes 1 and 2 as shown in FIG. 1 the electrodes 53 and 54 are formed of a disc which is cut along a diameter to produce the two electrodes. Facing this is a disc 55 which serves as the common electrode. The screen 56 is an element comprising a semi-circular sector which can be rotated in the space between the electrodes 53 and 54 and the common electrode 55. The disc forming the electrodes 53 and 54, the disc forming the common electrode 55 and the half disc forming the screen are all arranged on a common axis. As the screen 56 is rotated the relative capacitance between electrodes 53 and 55 and between electrodes 54 and 55 varies and can be used to form a measurement of the angular displacement as described in connection with the FIG. 1 arrangement.

The arrangement shown in FIG. 10 bears the same relation to the FIG. 5 arrangement as FIG. 9 bears to the FIG. 1 arrangement. In this arrangement the electrodes corresponding to 28 and 29 (FIG. 5) are formed of a disc which is separated along a spiral line to form electrodes 61 and 60. The common electrode 62 is a disc similar to 55 in FIG. 9. The screen is formed by an element of sector shape which moves in the space between electrodes 61, 60 and 62. As the screen 63 rotates about the common axis the relative capacitance between the electrodes 60 and 62 and electrodes 61 and 62 varies to form a measurement of angular displacement.

The arrangement shown in FIG. 11 is a preferred practical embodiment of the invention which is similar to that shown in FIG. 8. It comprises a cylindrical casing 71 inside of which are mounted a cylindrical first electrode 72 and a cylindrical second electrode 73 insulated from each other by an insulator 74. On the side of electrode 73 remote from that of electrode 72 is arranged a guard electrode 75 insulated from electrode 73 by an insulator 76. The common electrode 77 is a cylindrical rod mounted coaxially with electrodes 72 and 73 by means of the insulator 74 and 76. A hole 78 is drilled axially in the electrode 77 and a set screw 79 is inserted therein. Holes 80 are drilled sideways in electrode 77 to meet the hole 78 and by adjusting the position of the set screw 79 the area of electrode facing electrode 73 can be adjusted so as to adjust the capacitance between electrodes 73 and 77 for setting purposes. The screen 81 is mounted in a bearing 82 at the end of the outer case 71 so that it can be moved between electrode 77 and electrode 72 in an axial direction. The bearing 82 is separated from electrode 72 by an insulator 83. Leads from the three electrodes are brought to terminals at the end of the device opposite to that containing the screen 81, that from the common electrode 77 being taken to an output lead 84 which is connected to a cable 85. The electrodes 72 and 73 and the guard electrode 75 are connected to leads 86 which can be connected via a cable 87 to the electrical measuring equipment. A cover 88 protects the leads 84 and 86.

The advantage of placing the adjusting screw 79 inside the center electrode instead of in the position shown in FIG. 8 is that in that position it takes up less space and therefore allows the gap between inner and outer electrodes to be less thereby allowing a consequent reduction in size of the device. It also provides a more sensitive adjustment since the capacitance change can be adjusted to any desired slope by the dimensions of the holes 80.

In the arrangement as shown the internal diameter of electrode 73 is less than than of electrode 72. Since 73 provides a fixed reference capacitor, for a given capacitance it can be smaller in length because the gap between the electrodes is reduced. The variable capacitor formed by electrodes 72 and 77 requires a very uniform gap in order to achieve good linearity but since the manufacture of round cylinders is readily achieved in practice the device can be manufactured to produce good linearity. All the components 72, 73 and 75 and the three insulators 83, 74 and 76 are firmly bonded together. For example the insulators may be of aluminum oxide and the remaining components of a metal which has a metallic bond of high stability. This row of components is bonded to and supported by the bearing 82 so that there is no stress on these components other than that due to their own weight and to any residual stress produced by the bonding process.

The introduction of the guard electrode 75 is not essential to the operation but produces a slight improvement in accuracy because it is held at earth potential and bonded to electrode 73 via an insulator. If there is any slight axial movement of the electrode assembly relative to the body such as may be caused by thermal expansion then there will be a smaller change of potential from electrode 73 than would have been the case without the guard electrode 75. This is due to the end effect which is the distortion of the electrostatic field due to the electrode system not being of infinite length.

The transducer shown in FIG. 11 had an external diameter of 10mm, an overall length of 35mm with the sleeve portion 81 at the limit of its movement into the capacitors, and an overall length of 40 mm with the sleeve portion 81 withdrawn from the capacitors to its fullest extent. The range of measurement possible with the transducer was accordingly 5mm. The housing, electrodes and screen were made of stainless steel, or invar (36 percent Ni/Fe). The bearings were of stainless steel, bronze or tungsten carbide and the insulators of a ceramic such as $Al_2O_3$.

A suitable circuit arrangement for use with a device shown in FIG. 11 is shown in FIG. 12. It differs from FIG. 4 only in that the variable capacitor is in the other arm of the bridge. The reason for this is that the impedance of the capacitor varies as 1/C and since the capacitance variation is being used to measure displacement then the bridge must be used as a current balance device. The variable capacitor 91 corresponds to the capacitance between electrodes 72 and 77 and the fixed capacitance 92 corresponds to that between electrodes 73 and 77.

The bridge is supplied by an oscillator 93 to the high potential terminals of the capacitance arm of the bridge and to an inductive potentiometer 94. A differential amplifier is connected to the junction of capacitances 91 and 92 and to an earthed tap of the potentiometer 94. Another tap to the potentiometer 95 is connected to a further tapped inductor 96, the tap 97 of which is connected to a further inductor 98 the tap of which 99 is connected to the high potential terminal of the reference capacitor 92. The inductors 96 and 98 are arranged in decade fashion and although in the circuit diagram two of these are shown, in practice they may be as many as six or more such decades. Each of the respective tappings relates to a significant figure in the indication of the displacement of the movable part of the device.

It will be observed that the potentiometer 96 is tapped across a portion of winding 94 in a fixed manner. This is because winding 94 may not have the correct number of taps to provide the necessary decade. These transformers are generally made by braiding wires together in multiples of 12 (generally 12 or 24) and it is difficult to get 10 sections for the decade taps, and also just the right number of sections for the rest of the taps. Accordingly the second potentiometer 96 which has the correct number of tappings is connected across that part of winding 94 which has the right potential across it but the wrong number of tappings.

I claim:

1. Position transducer means of the variable capacitance type, comprising
    support means;
    first and second capacitor electrodes connected with said support means in linearly arranged axially spaced relation;
    a common capacitor electrode connected with said support means in uniformly spaced relation relative to said first and second capacitor electrodes, thereby to define first and second capacitances between said common electrode and said first and second electrodes, respectively; and
    screen means connected with said support means for movement in the space between said first and common electrodes to vary only said first capacitance, whereby the ratio of the first and second capacitance varies in accordance with the displacement of said screen means relative to said housing.

2. Apparatus as defined in claim 1, wherein said first and second electrodes are annular, colinearly arranged and axially spaced; wherein said common electrode is generally cylindrical and extends coaxially in concentrically spaced relation within said first and second electrodes; and further wherein said screen includes an annular portion that extends coaxially in concentrically spaced relation solely between said common and first electrodes.

3. Apparatus as defined in claim 2, and further including capacitance adjusting screw means connected for axial adjustment within, and in a direction parallel with the axis of, said second electrode, thereby to adjust the value of said fixed capacitance.

4. Apparatus as defined in claim 3, wherein said common electrode contains at one end a longitudinal bore that extends within said second electrode, and further wherein said adjusting screw means is threadably connected within, and longitudinally movable of, said bore.

5. Apparatus as defined in claim 3, wherein the portion of said common electrode arranged within said second electrode contains at least one radially extending through bore that communicates at its inner end with said longitudinal bore.

* * * * *